/ Patented Dec. 2, 1952

2,620,318

UNITED STATES PATENT OFFICE 2,620,318

OIL GELATION ACCELERATOR

Thomas Boyd, Springfield, and Russell B. Green, Chicopee Falls, Mass., assignors to Monsanto Chemical Company, St. Louis, Mo., a corporation of Delaware No Drawing. Application October 20, 1950, Serial No. 191,328

10 Claims. (Cl. 260—18)

This invention relates to gelled drying oils and more particularly to methods for gelling them.

Drying oils harden by two processes one of which is an oxidation reaction and the other of which is a condensation reaction. The oxidation reaction may be accelerated by the addition of metallic resinate driers and by blowing oxygen through the oil. The condensation reaction is not so easily accelerated and generally is completed only after many hours of heating at elevated temperatures.

One object of this invention is to provide a gelled oxidized drying oil.

A further object is to provide a process for accelerating the condensation reaction in oxidized drying oils.

Still another object is to provide new catalysts for accelerating the condensation reaction in oxidized drying oils.

These and other objects are attained by incorporating catalytic amounts of condensation polymers of organic derivatives of titanium in blown or partially oxidized drying oils.

The following examples are given in illustration and are not intended as limitations of this invention. Where parts are mentioned they are parts by weight.

Example I

Five parts of a condensation polymer of tetrabutyl orthotitanate were thoroughly mixed into 100 parts of air-blown linseed oil. The mixture was stirred vigorously at room temperature (circa 25° C.) and in a few minutes a firm gel formed which on further stirring broke into small pieces. Although the gel was firm, it could still be cut easily with a knife.

When Example I was repeated but the amount of condensation polymer was reduced to 2 parts, a gel was formed in about 30 minutes at room temperature. This gel was softer and more tacky than that of Example I.

Example II

Two parts of a condensation polymer of tetradecyl orthotitanate were mixed into 100 parts of blown tung oil. The mixture was stirred at 50° C. for about 20 minutes to form a clear firm oil gel.

The oils which may be gelled quickly by the catalysts of this invention are blown or partially oxidized drying oils such as linseed, tung, perilla, oiticica, candlenut, poppyseed, sunflowerseed, etc., oils and blown or partially oxidized semi-drying oils such as soyabean, cottonseed, rapeseed, corn, etc., oils. The oils should be blown or partially oxidized to the extent that they are viscous liquids prior to the addition of the catalysts.

The catalysts are condensation polymers of organic derivatives of titanium. These condensation polymers are described and claimed in copending application S. N. 122,844 filed October 21, 1949. They are prepared by reacting titanium organic derivatives with from 0.5 to 1 mol of water per mol of titanium compound under otherwise anhydrous conditions at room temperature or higher.

Among the titanium organic compounds which may be polymerized to form the polymer catalysts of this invention are esters of orthotitanic acid including the methyl, ethyl, propyl, isopropyl, butyl, isobutyl, secondary butyl, tertiary butyl, pentyl, octyl, iso-octyl, 2-ethyl hexyl, decyl, lauryl, stearyl, eicosanyl, etc. saturated esters, the allyl, ethallyl, methallyl, crotonyl, oleyl, vinyl, etc. ethylenically unsaturated aliphatic esters, the phenyl, cresyl, resorcinyl, naphthyl, etc. aromatic esters. The organic groups may contain inorganic substituents such as halogen, nitro, amino, sulfone groups, etc.

A second class of titanium organic derivatives which may be used to form the polymer catalysts are the mixed anhydrides of orthotitanic acid and organic acids. These compounds are sometimes called esters of the organic acid with the orthotitanic acid since the latter is amphoteric in character and may react as an alcohol. Among the mixed anhydrides which may be used are the orthotitanic tetra-acetate, tetrapropionate, tetrabutyrate, tetra-isobutyrate, tetralaurate, tetrastearate, tetra-oleate, tetrabenzoate, tetranaphthoate, tetracinnamoate, etc. Substituents such as halogen, nitro groups, amino groups, etc. may be present.

A third class of titanium compounds which may be used comprises the amides of orthotitanic acid. These include the reaction products of orthotitanic acid with ethyl amine, methyl amine, butyl amine, decyl amine, palmityl amine, oleyl amine, cetyl amine, aniline, benzyl amine, naphthyl amine, etc.

Organic derivatives of metatitanic may also be used to produce the condensation polymers of this invention.

The condensation polymers range from crystal clear viscous fluids to white waxy solids. They are soluble in substantially anhydrous organic solvents including anhydrous alcohols, hydrocarbons, ketones, etc. The polymers may be formed by adding the requisite amount of water slowly to the anhydrous titanium monomer with constant agitation. However, for ease of working, the polymerization is preferably carried out in an anhydrous solvent which may advantageously be an excess of the solvent used in making the monomer. The polymer may be isolated from the solvent by vacuum distillation if desired. However, in many cases the gelled oils will eventually be cut with the very solvents used to prepare the polymer and it then becomes advantageous to leave the polymer in solution and use the solution to gel the oil.

The amount of catalyst may be varied from about 0.1 part to about 5 parts per 100 parts of oil. At 5 parts, the gelation occurs very quickly at 25° C. for most oils, frequently taking only 3 to 4 minutes. When from 1 to 2 parts of catalyst are used, gelation occurs in from 20 minutes to 1 hour at 25° C. This time may be shortened by increasing the reaction temperature to 50° C. or higher. To obtain a uniform product, the reaction mixture should be subjected to vigorous agitation until the reaction is complete.

The process may be carried out in a substantially anhydrous solvent medium such as substantially anhydrous toluene, xylene, benzene, etc. Since these solvents are frequently a part of the compositions for which the gelled oil is intended, it is generally not necessary to remove them from the gel.

The gelled oils are particularly useful in preparing linoleum scratch, coating compositions, potting compounds, adhesives, wire insulation, etc.

It is obvious that variations may be made in the products and processes of this invention without departing from the spirit and scope thereof as defined by the appended claims.

What is claimed is:

1. A gel as in claim 9 wherein the oil is linseed oil.
2. A gel as in claim 9 wherein the oil is tung oil.
3. A gel as in claim 9 wherein the titanium polymer is a polymer of tetrabutyl orthotitanate.
4. A gel as in claim 9 wherein the titanium polymer is a polymer of tetradecyl orthotitanate.
5. A process as in claim 10 wherein the oil is blown linseed oil.
6. A process as in claim 10 wherein the oil is blown tung oil.
7. A process as in claim 10 wherein the titanium polymer is a polymer of tetrabutyl orthotitanates.
8. A process as in claim 10 wherein the titanium polymer is a polymer of tetradecyl orthotitanate.
9. A drying oil gel comprising a partially oxidized vegetable drying oil and a condensation polymer of an organic derivative of titanium taken from the group consisting of the esters, amides and organic acid anhydrides of orthotitanic acid, said polymer having been prepared by condensing one mol of the monomeric organic derivative of titanium with from 0.5 to 1.0 mol of water under otherwise anhydrous conditions.
10. A process for prepairing an oil gel which comprises mixing 100 parts of an oil taken from the class consisting of blown and partially oxidized vegetable drying and semi-drying oils, with from 0.1 to 5.0 parts of a condensation polymer of an organic derivative of titanium taken from the group consisting of the esters, amides and organic acid anhydrides of orthotitanic acid, said polymer having been prepared by condensing one mol of the monomeric organic derivative of titanium with from 0.5 to 1.0 mol of water under otherwise anhydrous conditions.

THOMAS BOYD.
RUSSELL B. GREEN.

REFERENCES CITED

The following references are of record in the file of this patent:

UNITED STATES PATENTS

| Number | Name | Date |
|---|---|---|
| 2,258,718 | Rothrock | Oct. 14, 1941 |

OTHER REFERENCES

Gardner et al.: Amer. Paint & Var. Mfgrs. Assn., Circular No. 366, July 1930, pp. 327–37.